Patented Oct. 13, 1959

2,908,709
PROCESS FOR PREPARING PHOSPHONATES

Leland K. Beach, Westfield, N.J., assignor to Esso Research and Engineering Company, a corporation of Delaware No Drawing. Application June 14, 1954
Serial No. 436,732

4 Claims. (Cl. 260—461)

This invention is concerned with the pyrolysis of a material containing principally mono methyl phosphite and phosphorous acid to obtain phosphonates, i.e., methane phosphonic acid and derivatives represented by the general formula:

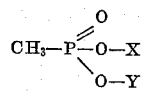

wherein X and Y stand for hydrogen, methyl, organic groups, or phosphorus-containing radicals.

The phosphonic acid and phosphonate derivatives can be obtained as relatively stable materials useful as chemical intermediates for making various materials, such as synthetic oils, modified resins, detergents, insecticides, additives for fuels, lubricating oils, and greases.

For some time it has been known that dimethyl hydrogen phosphite (DMHP) can be pyrolyzed to give methane phosphonic acid derivatives. This phosphite has been made by reaction of $PCl_3$ with methanol, the crude reaction product in making DMHP being distilled under vacuum below 100° C. and the bottoms being discarded.

The present invention is based on the discovery that by a proper high temperature pyrolysis treatment the still bottoms obtained in the manufacture of DMHP can be converted to desired phosphonates.

Example 1

One mole of $PCl_3$ in 400 cc. carbon tetrachloride solution was added slowly to three moles of methanol in 600 cc. of carbon tetrachloride agitated in a two liter flask kept at $-10°$ C. by means of an ice bath and a reflux condenser. The reaction product was stripped of HCl, methyl chloride and unreacted $PCl_3$ or methanol, and then fractionated under vacuum. A fraction containing dimethyl hydrogen phosphite was taken over at 50°–60° C. and 8 mm. Hg pressure. A yield of 35% was obtained. By iodimetric analysis the still bottoms were indicated to consist essentially of phosphorous acid and mono methyl phosphite with only small amounts of other materials.

Still bottoms of the type described above were pyrolyzed by heating to temperatures in the range of 200° to 350° C. particularly 250° C. to 300° C. for periods of preferably about 60 to 180 minutes to obtain optimum yields of the desired phosphonates.

Example 2

In the manufacture of DMHP was obtained a still bottoms which by analysis was indicated to contain 50% mono methyl phosphite, less than 1% DMHP, about 5% phosphate and the balance $H_3PO_3$ and related material.

The bottoms described was heated to 290° C. over a period of 1½ hours. The product collected showed that 83% of the mono methyl phosphite was converted to other products, 75% of the mono methyl phosphite being converted selectively to methane phosphonic acid derivatives and only 25% going to oxidation-reduction products which are the undesired phosphates and phosphines.

Example 3

A crude undistilled dimethyl hydrogen phosphite (DMHP) obtained by stripping as in Example 1 was found to consist of 45% DMHP and the rest mono methyl phosphite and phosphorous acid. This crude was pyrolyzed in a three stage continuous Pyrex reactor at 290° C. and with a 3 hour contact time. A 70% yield of the desired methane phosphonic acid derivatives was obtained based on the stripped crude.

Following the usual procedure, the crude DMHP would have been vacuum distilled and the 45 parts of distilled DMHP pyrolyzed to give a yield of only 34% based on the stripped crude.

Tests have been conducted to show that adequate pyrolysis temperatures and residence periods for the conversion of the mono methyl phosphite are of the order of 200°–350° C. and 1 to 3 hours.

Certain measures can be used, if desired, to increase the conversion, particularly the addition of methyl esters of phosphoric acid.

Example 4

Following the procedure described in Example 3, methyl phosphates, mono-, di-, and tri-, were added to obtain substantially increased amounts of conversion to the desired phosphonates. On adding the phosphate esters a faster conversion was obtained even at relatively lower temperatures, e.g. 100° to 250° C. Final yields were substantially increased by adding the phosphate esters, e.g. increased up to as much as 80+%.

To minimize the addition of the phosphate esters or other alkylating agents, the pyrolytic conversion is carried out first in the absence of the esters until approximately a peak yield of phosphonates is obtained, then the esters are added to give further conversion on the partly reacted mixture of mono methyl phosphite and phosphorous acid.

It has been observed that variations in the composition of the DMHP still bottoms cause variations in the pyrolysis results; for example: higher temperatures are required and poorer yields result as the phosphorous acid content increases.

It is to be understood that various methylating or alkylating compounds may be used in place of the methyl phosphates, but the methyl phosphates are preferred. Methyl or alkyl esters of related elements, such as borates, may be used. If desired, catalysts such as boron fluoride may be used in the reaction or in some stage of the reaction.

The desired phosphonate products of this invention may be employed as chemical intermediates in preparing additives for fuel, lubricating oils, or greases, in preparing detergents, fire retardants, insecticides and plasticizers. The methane phosphonic acids undergo reaction with alcohols, esters, salts, bases, as well as with halogen and non-metallic halides.

In addition to the preceding ideas and suggestions others will be obvious to those skilled in the art.

The invention described is claimed as follows:

1. Process for preparing phosphonates which comprises heating a mixture of mono methyl phosphite and phosphorous acid to temperatures in the range of 200° to 350° C.

2. Process for preparing phosphonates which comprises reacting $PCl_3$ with methanol to produce a crude mixture containing dimethyl hydrogen phosphite, mono methyl phosphite and phosphorous acid, stripping dimethyl hydrogen phosphite from said crude mixture, then heating the residual crude mixture to temperatures in the range of 200° to 350° C. for a period of one to three hours to convert remaining phosphite therein to phosphonates.

3. Process of claim 2, wherein the residual crude mixture of phosphorous acid and mono methyl phosphite is heated in stages, and wherein a methyl phosphate is added in at least one of said stages to increase conversion of the phosphite to desired phosphonates.

4. The process for preparing phosphonates by heating a mixture containing mono methyl phosphite and phosphorous acid at 200° to 350° C. which comprises reacting $PCl_3$ with methanol to produce a crude mixture containing the mono methyl phosphite with dimethyl hydrogen phosphite and phophorous acid, stripping any HCl, methyl chloride, unreacted $PCl_3$ and methanol from said crude mixture, then heating a residual portion of said crude mixture containing the mono methyl phosphite, dimethyl hydrogen phosphite and phosphorous acid to temperatures in the range of 200° to 350° C. to form corresponding methane phosphonates.

No references cited.